US009578025B2

(12) United States Patent
Pinski et al.

(10) Patent No.: US 9,578,025 B2
(45) Date of Patent: Feb. 21, 2017

(54) MOBILE NETWORK-BASED MULTI-FACTOR AUTHENTICATION

(71) Applicant: ZUMIGO, INC., San Jose, CA (US)

(72) Inventors: David Aaron Pinski, Narbeth, PA (US); Partha Chowdhury, Los Altos, CA (US)

(*) Notice: Subject to any disclaimer, the term of this patent is extended or adjusted under 35 U.S.C. 154(b) by 0 days.

(21) Appl. No.: 14/514,247

(22) Filed: Oct. 14, 2014

(65) Prior Publication Data

US 2015/0106900 A1    Apr. 16, 2015

Related U.S. Application Data

(60) Provisional application No. 61/890,783, filed on Oct. 14, 2013.

(51) Int. Cl.
*H04L 29/06* (2006.01)
*H04W 12/06* (2009.01)
*H04W 4/02* (2009.01)

(52) U.S. Cl.
CPC .......... *H04L 63/0876* (2013.01); *H04L 63/08* (2013.01); *H04L 63/083* (2013.01); *H04W 4/02* (2013.01); *H04W 12/06* (2013.01)

(58) Field of Classification Search
CPC .... H04L 63/0876; H04L 63/083; H04L 63/08; H04W 12/06; H04W 4/02
USPC .................................................... 726/4, 5, 7
See application file for complete search history.

(56) References Cited

U.S. PATENT DOCUMENTS

| | | | | |
|---|---|---|---|---|
| 8,532,652 | B1* | 9/2013 | Edara | H04W 4/001 455/432.3 |
| 8,904,506 | B1* | 12/2014 | Canavor | G06F 17/30 713/182 |
| 9,210,028 | B1* | 12/2015 | Pinson | H04L 65/4084 |
| 2006/0251256 | A1* | 11/2006 | Asokan | H04L 63/065 380/270 |
| 2014/0123232 | A1* | 5/2014 | Kuscher | H04W 12/08 726/4 |
| 2014/0282895 | A1* | 9/2014 | Stuntebeck | G06F 21/34 726/4 |
| 2015/0350173 | A1* | 12/2015 | Tanase | H04L 63/10 726/7 |

OTHER PUBLICATIONS

Privacy-aware and energy-efficient geofencing through reverse cellular positioning, Ulirch Bareth, Wireless Communications and Mobile Computing Conference (IWCMC), 2012 8th International, IEEE, Sep. 2012.*

(Continued)

*Primary Examiner* — Luu Pham
*Assistant Examiner* — Jahangir Kabir
(74) *Attorney, Agent, or Firm* — Patterson & Sheridan, LLP

(57) ABSTRACT

Verification of a user login to a secure account from a mobile device occurs when the user provides login credentials and a hardware identifier (ID) corresponding to the mobile device. The provided login credentials and hardware ID are then verified against a registry. Further, the mobile device determines and provides a geographic location of the mobile device using a global positioning system (GPS) component installed therein. The location provided by the mobile devices is then matched with a location of a network element with which the mobile device is currently communicating.

18 Claims, 5 Drawing Sheets

(56) References Cited

OTHER PUBLICATIONS

Matlock: A location obfuscation technique for accuracy-restricted applications, Wightman et al, Wireless Communications and Networking Conference (WCNC), 2012 IEEE, IEEE, Apr. 2012.*

* cited by examiner

MOBILE NETWORK-BASED MULTI-FACTOR AUTHENTICATION

CROSS REFERENCE TO OTHER APPLICATIONS

This application claims priority to U.S. Provisional Patent Application No. 61/890,783, entitled "MOBILE NETWORK-BASED MULTI-FACTOR AUTHENTICATION," filed Oct. 14, 2013, the entire contents of which are incorporated herein by reference.

BACKGROUND

Maintaining secure logon practices is critical to many web sites and applications, including financial, business and governmental web sites. A common way that an end user is authenticated prior to accessing a web site (or application) is by the end user providing a password to the web site, where software that executes on the web site authenticates the password so provided before granting to the end user access to the web site. However, because passwords may be lost or compromised, a second method (i.e., second level) of authentication is sometimes used. This second method may involve providing personal information that is typically in the end user's sole possession, such as a mother's maiden name or a one-time password generated by a token device. Typically, these backup authentication methods are employed when an existing customer uses a new device, such as a PC, tablet, or smartphone, to access the secure web site or application. In financial services, backup authentication methods are sometimes employed to further authenticate risky transactions, such as the transfer of large sums of money or wire transfers.

The "two-factor" authentication method described above, however, has become less secure, because hackers may be able to obtain user IDs and passwords using malware, and may also be able to obtain an end user's personal information, such as a mother's maiden name or birth date, using social media and other tools. One way to make two-factor authentication more secure is to employ a "one-time use" token (e.g., a password) as the second-level authentication method, but devices for generating the one-time use tokens are typically expensive. Thus, consumers do not like using them. The one-time use token may be delivered via SMS, but without validation of the delivery end point, it could be delivered to an unintended address, or redirected to a hacker's address. The use of such tokens also requires then entry of additional data by the end user, which tends to further reduce the potential adoption rate of one-time use tokens.

Another authentication method that has been adopted to determine if user credentials are being improperly used involves identifying the device that is being utilized for the logon. One approach currently in use is referred to as "device reputation." With this approach, software on the device being used for logging on creates a "device fingerprint," which is composed from the software and operating system configuration of the device. When an end user registers with an authentication service, the device fingerprint is generated upon user registration, is subsequently stored by the authentication service, and, during each attempted logon to the end user's account, the stored device fingerprint is compared with a device fingerprint generated by the user's device at the time of the logon attempt. However, while this approach has some value, it is not particularly reliable, as software configurations often change. Further, the device reputation approach is not entirely secure because the device fingerprint can be copied.

SUMMARY

In a first embodiment, a method of authenticating a user logging into a secure account using a mobile device is provided. The method comprises the steps of verifying login credentials for the user and verifying a hardware ID of the mobile device. The method further comprises the step of verifying that a location of the mobile device determined using a global positioning system (GPS) component installed in the mobile device matches a location of a network element with which the mobile device is currently communicating.

Further embodiments provide a non-transitory computer-readable medium that includes instructions that, when executed, enable one or more computing devices to implement aspects of the above method, and a system comprising a mobile device, an application server, and a device identification server, connected to one another over one or more networks, and which are configured to perform one or more aspects of the above method.

DETAILED DESCRIPTION

Figure 1:
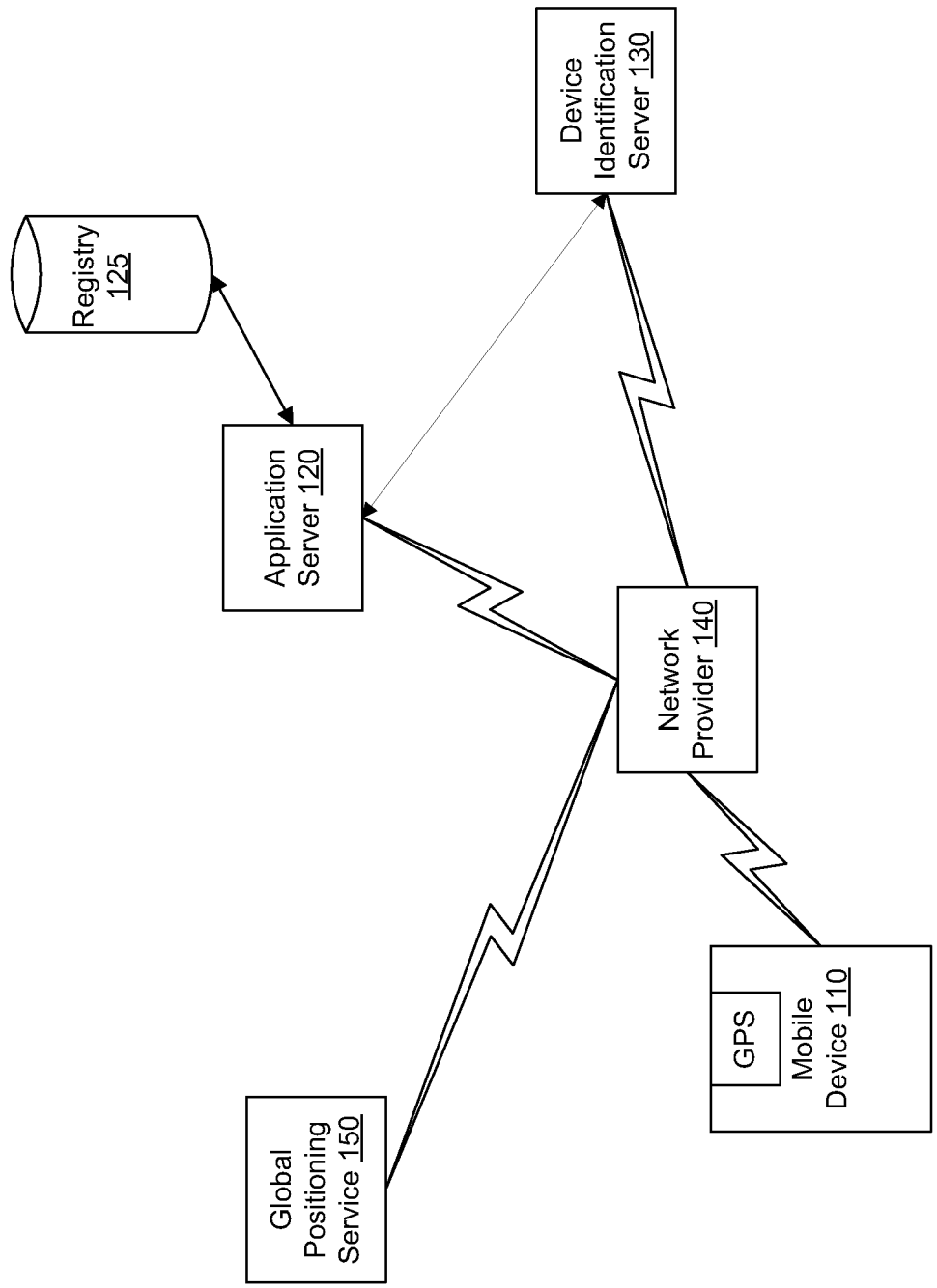
FIG. 1 is a block diagram of mobile network-based multi-factor authentication system, according to one or more embodiments.

Embodiments disclosed herein provide a multi-factor authentication system that employs mobile network data and mobile network messaging services to identify a mobile device without specific user interaction. FIG. 1 is a block diagram of mobile network-based multi-factor authentication system, according to one or more embodiments. In FIG. 1, mobile device 110 connects to a mobile network (i.e., a cellular wireless network). In embodiments, mobile device 110 may be a cellular telephone, smartphone, personal digital assistant, or tablet device. Mobile device 110 includes a wireless communication adapter (not shown) capable of communicating over any number of cellular networks. Mobile device 110 also includes a Subscriber Identity Module (SIM) card, which is an integrated circuit that securely stores identification information used to identify and authenticate mobile device 110 when the device connects to a cellular network.

Mobile device 110 communicates wirelessly with a network provider 140. Network provider 140 is a wireless service provider, wireless carrier, cellular telephone company, or mobile network carrier, and provides a wireless communication infrastructure, as well as a back haul infrastructure, that enables mobile device 110 to communicate with other network devices. Mobile device 110 accesses network provider 140 by communicating with a cellular network base station that mobile device 110 is in close physical proximity with. It should be noted that when the owner of mobile device 110 "roams" (or moves to a location that is remote from any of the network base stations owned by network provider 140), then mobile device 110 connects to and communicates over a different cellular network, which does have a base station close to the new location that mobile device 110 is situated. In order to identify mobile device 110, network provider 140 generates and maintains a network identifier (ID) corresponding to mobile device 110.

As shown in FIG. 1, mobile device 110 communicates with several other network services through network provider 140. One such network service is global positioning service 150. As shown, mobile device 110 includes an on-board GPS component. The GPS component communicates wirelessly (through the wireless adapter and network provider 140) with a global positioning service 150. Global positioning service 150 is a satellite-based system that broadcasts position information that mobile device 110 receives (via network provider 140) and uses to calculate geo-spatial coordinates corresponding to the position of the mobile device.

Mobile device 110 also communicates with an application server 120. According to embodiments, application server 120 is a host computer that includes a wireless adapter, or which connects to a wireless hub over a local- or wide-area network. Application server 120 executes application software that mobile device 110 accesses in order to perform application specific functions. For example, application server 120 may be a banking server that stores user account information and which is programmed to provide such information to authorized end users. An end user accesses application server 120 by connecting (wirelessly) to the server via network provider 140. In order for an end user to gain access to account information (or other sensitive information) stored on application server 120, such end user needs to provide a login request, along with login credentials (such as a user ID and password) to application server 120. Application server 120 then checks the provided credentials against a registry (such as registry 125), which is storage device connected to application server 120. In some embodiments, registry 125 may be a remote storage device accessible to application server 120 over a storage area network. Once application server 120 determines that the credentials provided by mobile device 110 match credentials stored in registry 125, application server 120 may then determine that the end user of mobile device 110 is authorized to access the account data.

It should be noted that user ID and password information is only one means by which application server 120 authenticates a login request. According to embodiments, application server 120 also stores (in registry 125) a device ID that corresponds to mobile device 110. For example, when the end user of mobile device 110 initially configures the device to access application server 120, application server 120 receives a unique device ID (i.e., a unique number or alphanumeric string) and stores this device ID in registry 125. In some embodiments, application server 120 communicates with mobile device 110 over a cellular network (such as network provider 140) using the device ID.

Referring to FIG. 1, mobile device 110 also communicates (via network provider 140) with a device identification server 130. Device identification server 130 is a host computer that communicates wirelessly with mobile device 110, as well as over a physical network (such as a local area or wide area network) with application server 120. As will be described below, embodiments of device identification server 130 perform verification of the location of mobile device 110. In order to perform this verification, device identification server 130 receives information (i.e., geographic coordinates) from mobile device 110. Further, device identification server 130 communicates with network provider 140 in order to determine a network location corresponding to mobile device 110. After receiving the geographic coordinates and determining the network location of mobile device 110, device identification server 130 compares these data items and transmits a comparison result (over the physical network) to application server 120.

Figure 2:
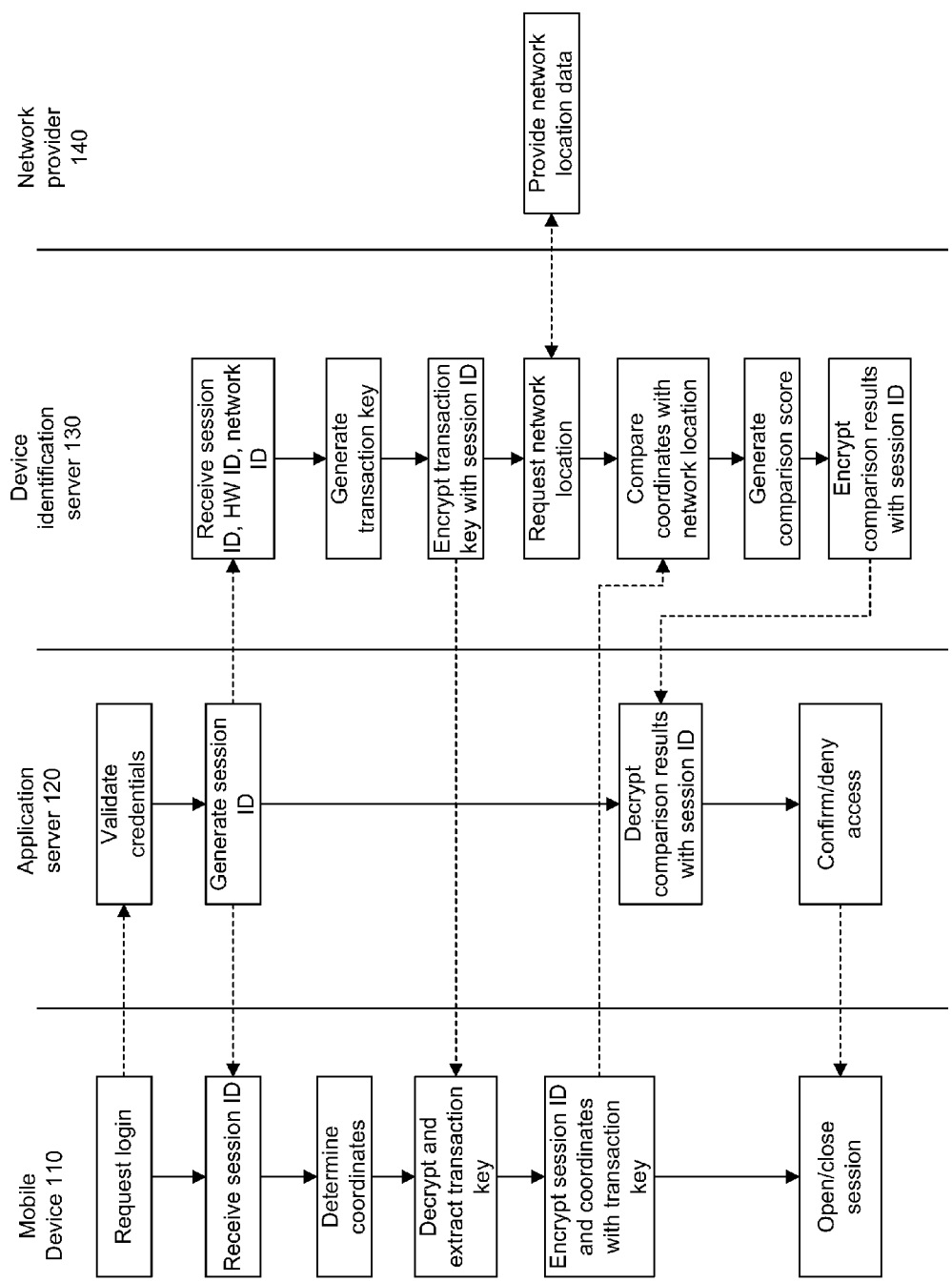
FIG. 2 is a data flow diagram that illustrates steps of an authentication method carried out by components of a multi-factor authentication system, according to embodiments.

FIG. 2 is a data flow diagram that illustrates steps of an authentication method carried out by components of the multi-factor authentication system depicted in FIG. 1. The first component is mobile device 110, which executes client software that an end user employs to access a secure account, such as a bank account. The second component is application server 120, which hosts the application or web site that the end user tries to log into. The third component is device identification server 130, which communicates with application server 120 and with mobile device 110. Finally, network provider 140 provides a wireless infrastructure over which mobile device 110 communicates. Further, network provider 140 includes an information server, which accepts requests for and provides subscriber information, based on a network ID of the subscriber. For example, as will be described below, network provider 140 provides network location data for a device that a subscriber having a particular network ID uses to communicate with.

According to embodiments, when an end user attempts to log in to an application executing on application server 120 using mobile device 110, mobile device 110 transmits login credentials to application server 120. Examples of login credentials include a user ID for the application, a password corresponding to the user ID, and a device ID corresponding to mobile device 110. If a device ID is not provided with the login request, then account server 120 may request a confirmation of the device ID based on a network ID (i.e., phone number) of mobile device 110. It should be noted that the network ID of mobile device 110 is obtained from registry 125 because the network ID is among the data items registered by application server 120 with the device fingerprint of mobile device 110.

In this example, it is assumed that when the end user installed the client software for accessing application server 120 from mobile device 110, the end user registered the phone number (i.e., network ID) of the mobile device with application server 120, and that mobile device transmitted a "device fingerprint" to application server 120 for storage in registry 125. According to embodiments, the device fingerprint includes the device ID of mobile device 110.

After receiving the login credentials, application server 120 validates those credentials against the credentials (i.e., user ID, password, and device ID) previously stored in registry 125. In addition, application server 120 generates a session ID (SID). Application server 120 transmits the SID over a secure communication channel (e.g., a secure socket layer (SSL) connection) to mobile device 110 and to device identification server 130. In addition to the SID, account server 120 transmits to device identification server 130 the network ID of mobile device 110 over the secure communication channel. Further, application server 120 also transmits the device ID of mobile device 110 to device identification server 130.

Once mobile device 110 receives the SID from application server 120, mobile device 110 then determines geo-coordinates corresponding to the location of the mobile device using the GPS component installed therein.

As shown in FIG. 2, upon receipt of the SID, device identification server 130 generates a transaction identification key (TIK) corresponding to the login event, and then encrypts the TIK using the SID as the encryption key. After encrypting the TIK, device identification server 130 transmits the encrypted TIK to a mobile device having the network ID that device identification server 130 received from application server 120. The communication channel used for transmitting the encrypted TIK may be SMS, secure SMS, or OS-based in-application messaging (e.g., server push). In cases where the login request is transmitted by a mobile device not associated with the network ID provided by application server 120 (such as by a hacker or a user with a different mobile device), the encrypted TIK would be transmitted to a mobile device that is different from mobile device 110. In such a case, authentication fails.

In a first scenario corresponding to the example shown in FIG. 2, the login request is made with a mobile device associated with the network ID that device identification server 130 received from application server 120 (i.e., mobile device 110). As a result, mobile device 110 receives the SID from application server 120 and the encrypted TIK from device identification server 130.

Once device identification server 130 transmits the encrypted TIK, device identification server 130 requests network location data corresponding to mobile device 110. In one or more embodiments, this network-based location data corresponding to mobile device 110 is determined according to methods described in U.S. patent application Ser. No. 13/493,923, filed Jun. 11, 2012 and entitled "System and Method for Locating a Mobile Subscriber Terminal When Roaming," the entire contents of which are incorporated herein by reference. As shown, the request for network-based location data is transmitted to network provider 140. The request includes the network ID that device identification server 130 received from application server 120. Further, the network-based location data received from network provider 140 corresponds to a network device (such as a base station) that the device corresponding to the network ID is in communication with.

As shown in FIG. 2, upon receipt of the encrypted TIK, the client software executing on mobile device 110 decrypts and extracts the encrypted TIK using the SID received from application server 120. Mobile device 110 then encrypts the geo-coordinates previously determined using the GPS component (along with the SID) using the TIK as the encryption key. This encrypted message is then transmitted back to device identification server 130 over a secure communication channel.

Upon receipt of this encrypted message from mobile device 110, device identification server 130 decrypts the received message using the TIK to extract the SID and the geo-coordinates. The extracted SID is compared with the SID that device identification server 130 previously received from application server 120. Further, the extracted geo-coordinates of the mobile device are compared with the network-based location data that device identification server 130 received from network provider 140.

After these two levels of authentication have been carried out, device identification server 130 encrypts the authentication results using the SID, and transmits the encrypted results to application server 120. Application server 120 then decrypts the results with the SID, and either confirms or denies the login request.

As shown in FIG. 2, in some embodiments, device identification server 130 generates a score for the different authentication factors (i.e., password authentication, device ID authentication, SID authentication, and location authentication). In such embodiments, this score is transmitted to application server 120. Application server 120 then evaluates the score and determines whether to permit or deny the login request, according to authentication policies maintained at application server 120.

As previously mentioned, in a scenario where a login request is made using a mobile device not associated with a network ID (i.e., a phone number) that is linked to the end user account on application server 120 (e.g., by a hacker or a user with a different mobile device), the encrypted TIK is not transmitted to that mobile device. As a result, the attempted login times out because application server 120 does not receive authentication results from device identification server 130.

As disclosed above, the multi-factor authentication method embodiments creates a "device lie-detector" that is difficult to defeat. If account credentials are stolen, a thief would typically utilize a device unknown to application server 120. In addition, if a thief manages to falsify the location of a mobile device to match the end user's home location, the above method will flag the discrepancy in the reported location of the mobile device (based on the GPS) with the network-based location of the mobile device (based on the data provided by the network provider).

In another scenario, a thief may attempt to log in using stolen credentials that are associated with a registered device ID. While the location of the device that the thief is using may match the end user's current location, the message transmitted by device identification server 130 would not be sent to the device that the thief is using. Thus, as described above, authentication would fail.

In addition, embodiments of the multi-factor authentication method may permit a login request when a customer has changed a SIM card for mobile device 110. This may occur while the customer is traveling in a different country, or if the customer changes domestic carriers. In such a scenario, the replaced SIM card will result in a new phone number being issued to the phone. However, the device ID may remain the same. Therefore, if application server 120 gives lower weight to location authentication and higher weight to device ID authentication, the login request may still be permitted.

For example, referring to FIG. 2, because the device ID has not changed, any out-of-band messaging to mobile device 110 will still connect to the device based on the device ID. However, the location check, which is dependent on the network ID supplied by the SIM card, will fail. This failure can trigger an SMS or device message to the end user requesting identification of the new mobile number (i.e., network ID). Depending on device permissions, this step of identifying the new SIM card may be automated, allowing this re-registration to be completed without user intervention.

In one embodiment, a SIM card "swap" triggers the functionality described above. As mentioned, the network will not be able to locate the device based on the original SIM registration (i.e., the originally registered network ID). However, out-of-band messaging to the mobile device, and any server to device communication based on device ID, will still succeed. Thus, in this embodiment, an out-of-band message to the device triggers an event on the device to ask if the SIM card has changed. In the case of Android® devices, it could be fully automated where the client software on the device identifies the point of failure, accesses the new SIM identity, and passes it to device identification server 130. Then, device identification server 130 completes location verification checks, and notifies application server 120 that the SIM card has been changed.

Figure 3:
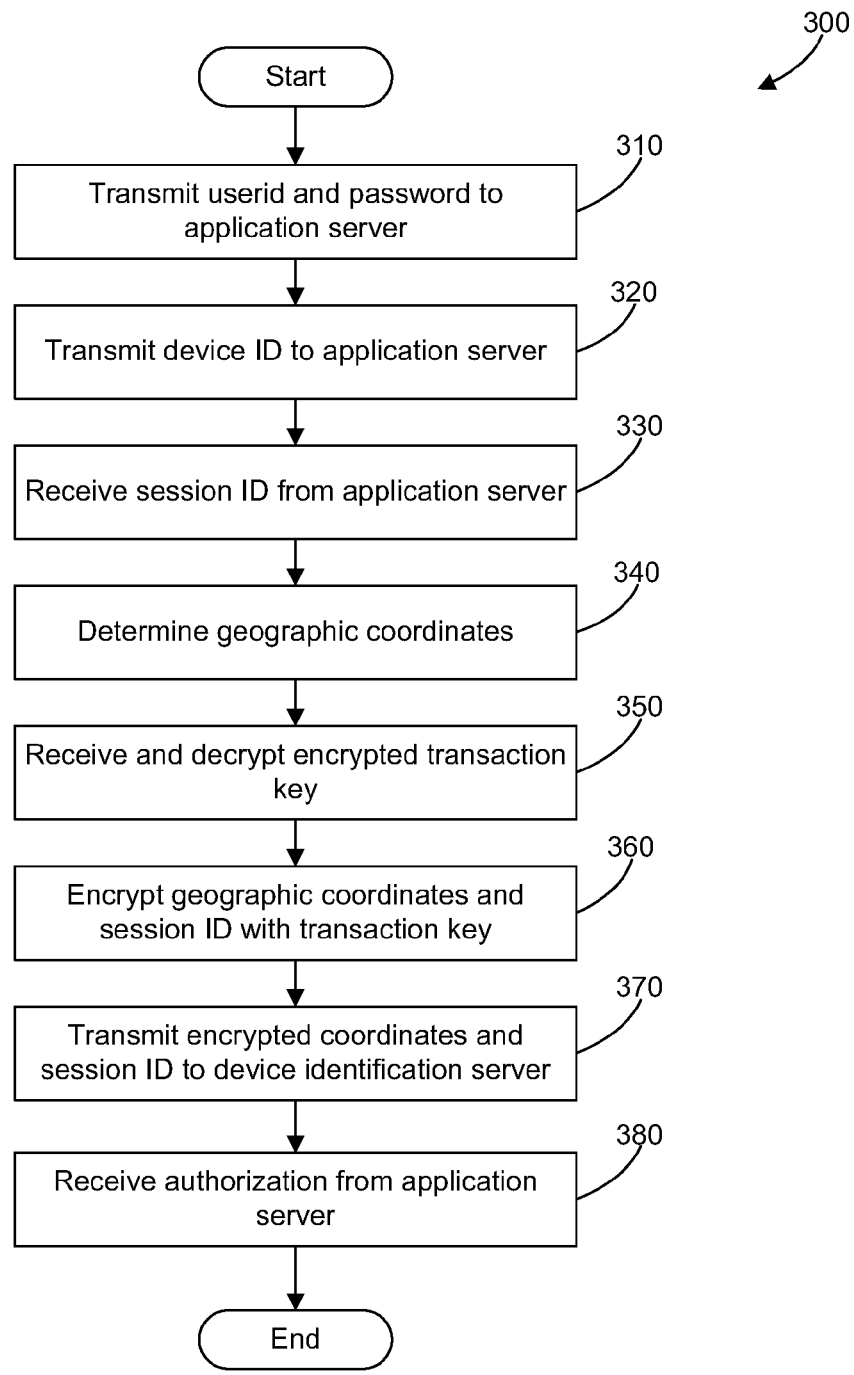
FIG. 3 is a flow diagram that depicts a method by which a mobile device securely logs in to an application server, according to one or more embodiments.

FIG. 3 is a flow diagram that depicts a method 300 for a mobile device to securely log in to an application server, according to one or more embodiments. Method 300 is performed by client software executing on a mobile device, such as mobile device 110.

Method 300 begins at step 310, where mobile device 110 transmits a user ID and password to an application server (such as application server 120). The user ID and password correspond to an account held for the end user of mobile device 110 at application server 120. Next, at step 320, mobile device 110 transmits a device ID to application server 120. The device ID is a unique identifier for mobile device 110. As previously mentioned, application server 120 has a device ID pre-registered for mobile 110.

Having transmitted user ID, password, and device ID (i.e., credentials) to application server 120, mobile device 110 then, at step 330, receives a session ID from application server 120. The session ID is distributed by application server 120 to both mobile device 110 and device identification server 130 for use as an encryption key for communication amongst mobile device 110, application server 120, and device identification server 130. The session ID represents the key to be used to secure communications pertaining to the login request transmitted by mobile device 110.

At step 340, mobile device 110 determines geographic coordinates that correspond to the location of mobile device 110. In one or more embodiments, mobile device 110 receives a signal (through its on-board GPS component) from a GPS satellite or, alternatively, from network provider 140, which may itself include GPS receivers. It should be noted that the geographic coordinates determined by mobile device 110 correspond to the current physical location of the device.

At step 350, mobile device 110 receives an encrypted transaction key from device identification server 130. Similar to the session ID, the transaction key (which is generated by device identification server 130) is used to secure communications that occur solely between mobile device 110 and device identification server 130. As will be described below, device identification server 130 encrypts the transaction key with the session ID. Thus, since mobile device 110 has already received the session ID from application server 120 (at step 330), mobile device 110 decrypts (also at step 350) the transaction key received from device identification server 130.

Having received and decrypted the transaction key, mobile device 110 then encrypts the geographic coordinates (which were previously determined at step 340) using the transaction key. Further, mobile device 110 also encrypts the session ID using the transaction key. Mobile device 110 then transmits, at step 370, the encrypted geographic coordinates and session ID to device identification server 130. Mobile device 110 encrypts and transmits both of these data items to enable device identification server 130 to verify both the session ID and the geographic coordinates, which will be described further below.

At step 380, mobile device 110 receives authorization to log in from application server 120. The authorization is performed by application server 120 according to methods set forth below. Further, in situations where application server 120 denies authorization of the login request from mobile device 110, mobile device 110 receives this denial at step 380.

Figure 4:
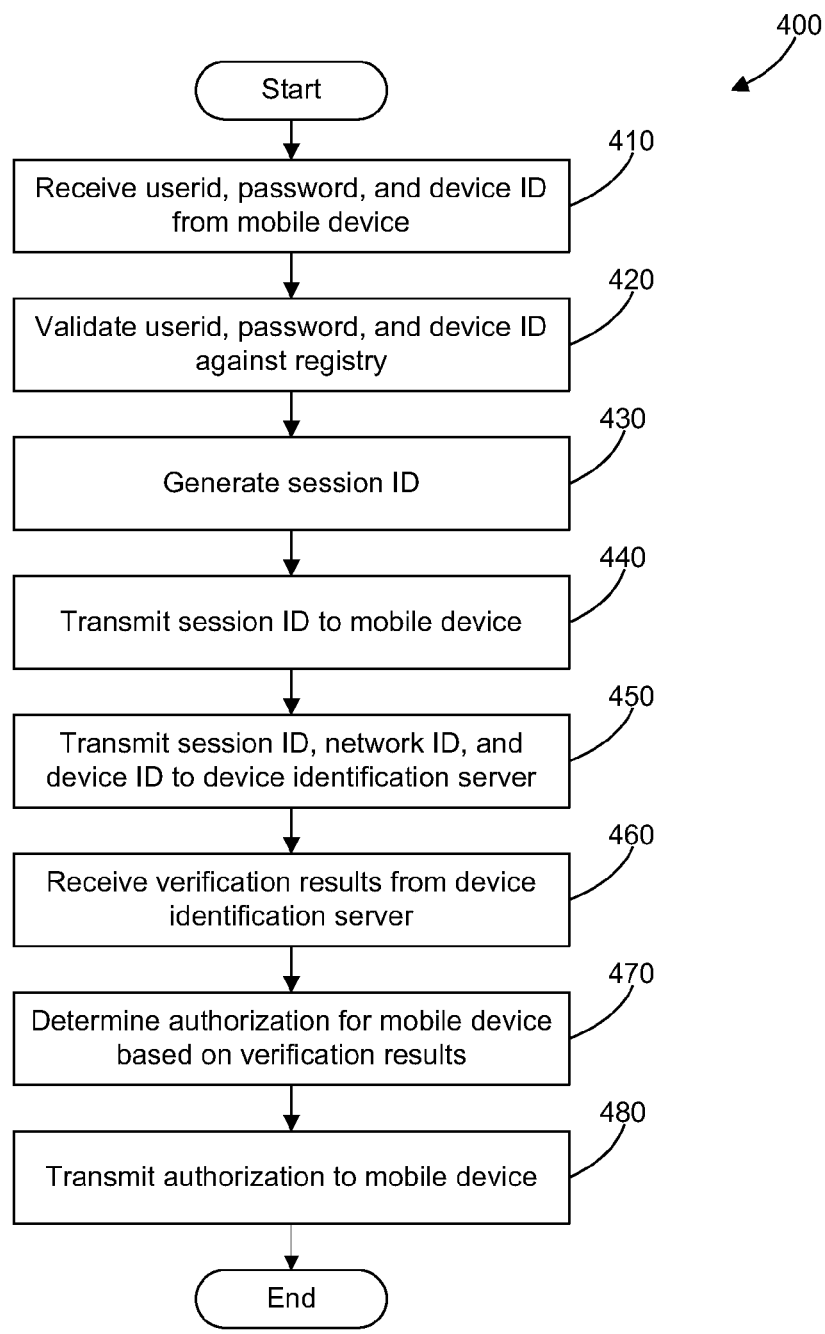
FIG. 4 is a flow diagram illustrating a method by which an application server authorizes a login request received from a mobile device, according to one or more embodiments.

FIG. 4 is a flow diagram illustrating a method 400 for an application server to authorize a login request received from a mobile device, according to one or more embodiments. Method 400 is performed by server software executing on an application server, such as application server 120.

Method 400 begins at step 410, where application server receives a login request from a mobile device, such as mobile device 110. The login request includes a user ID, password, and device ID corresponding to the mobile device. The user ID and password correspond to an account that an end user has previously registered with application server 120.

At step 420, application server 120 validates the received user ID, password, and device ID. To perform this step, application server 120 verifies the user ID, password, and device ID against data stored in a registry maintained at the server (such as registry 125 depicted in FIG. 1). As previously mentioned, registry 125 is updated to store account information (e.g., user ID, password, and device ID) when an end user initially registers the account using a mobile device. Thus, in order to use an application executing on application server 120 at a future time, mobile device 110 transmits these data items to application server 120. If application server 120 validates the information, then an indicator of the validation is initially stored by application server 120. That is, application server 120 notes that mobile device 110 has passed two levels of validation (i.e., user ID/password and device ID). However, according to some embodiments, application server 120 may require an end user to pass additional levels of validation before a login request will be granted.

At step 430, application server 120 generates a session ID corresponding to the login request received from mobile device 110. Application server 120 then transmits this session ID to mobile device 110 at step 440. Further, at step 440, application server 120 transmits the generated session ID, along with the network ID and device ID that correspond to mobile device 110, to device identification server 130. As mentioned previously, the session ID is used to secure communication among mobile device 110, application server 120, and device identification server 130. Application server 120 transmits the network ID of mobile device 110 to device identification server 130 in order to enable device identification server 130 to communicate directly (via network provider 140) with mobile device 110. Further, as will be described below, device identification server 130 uses the network ID of mobile device 110 to determine a location of a network component (such as a cell tower or base station) that mobile device 110 is in communication with. The device ID is provided to device identification server 130 in order to enable "out-of-band" communication between device identification server 130 and mobile device 110. Such communication is required when an end user swaps the original SIM card of the mobile device with a new SIM card, thereby disabling communication between device identification server 130 and mobile device 110 based on network ID.

At step 460, application server 120 receives verification results from device identification server 130. According to one or more embodiments, verification results include an indication of whether the geographic location of mobile device 110 corresponds to the location of a network component (cell tower or base station) that the mobile device is in communication with. Thus, after step 460, application server 120 has verification results pertaining to the user ID and password provided by mobile device 110, the device ID provided by mobile device 110, and whether the determined geographic location of mobile device 110 matches its determined network location.

At step 470, application server 120 determines whether or not mobile device 110 is authorized to log in, based on one or more of the above-mentioned verification results. In one or more embodiments, all of the aforementioned items must be successfully verified in order for application server 120 to authorize the login request received from mobile device 110. However, in other embodiments, application server 120 implements a policy that is more permissive, authorizing a login request where certain items (such as location data) are not successfully verified. Finally, at step 480, application server 120 transmits an authorization message (or, non-authorization message, as the case may be) to mobile device 110.

Figure 5:
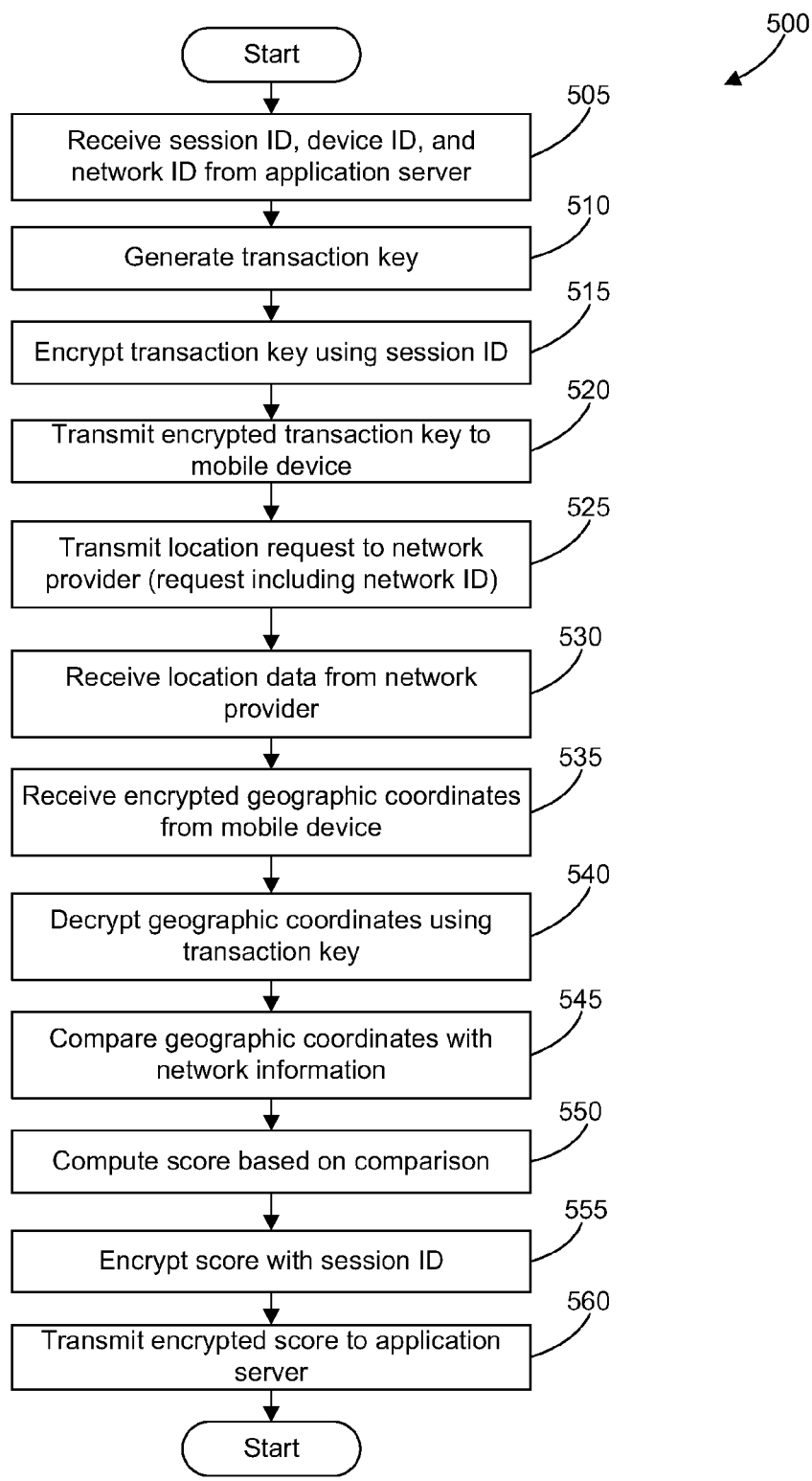
FIG. 5 is a flow diagram illustrating a method by which a device identification server validates the location of a mobile device, according to one or more embodiments.

FIG. 5 is a flow diagram illustrating a method 500 for a device identification server to validate the location of a mobile device, according to one or more embodiments. Method 500 is performed by software executing on a server, such as device identification server 130.

Method 500 begins at step 505, where device identification server 130 receives from application server 120 the session ID, device ID, and network ID corresponding to mobile device 110. Each of these items was previously described in connection with FIG. 4. Next, at step 510, device identification server 130 generates a transaction key (described above as a TIK). The TIK is used to secure communications between mobile device 110 and device identification server 130.

At step 515, device identification server 130 uses the session ID received at step 505 to encrypt the generated TIK. At step 520, device identification server 130 transmits the encrypted TIK to mobile device 110. This transmission is performed using the network ID received at step 505.

Having transmitted the transaction key to mobile device 110, device identification server 130 then transmits, at step 525, a location request to network provider 140. The location request includes the network ID received at step 505. The location request is processed by network provider 140, which provides physical location data corresponding to a network component that the device having the aforementioned network ID is in communication with. This network component may be a cell tower or base station. This location data is then received by device identification server 130 (from network provider 140) at step 530. Based on the location data received from network provider 140, device identification server 130 is able to determine a location for mobile device 110 independent from any information provided by the mobile device. However, in an alternate embodiment, network provider 140 (rather than device identification server 130) determines the location of the mobile device having the aforementioned network ID.

Further, at step 535, device identification server 130 receives encrypted geographic coordinates from mobile device 110. These coordinates are determined by mobile device 110 according to method 300. At step 540, device identification server 130 decrypts the received geographic coordinates using the transaction key (or TIK), which was previously generated at step 510. At step 545, device identification server 130 compares the decrypted geographic coordinates with the network location data received at step 530. Based on this comparison, device identification server 130, at step 550, computes a score. For example, if the network location received from network provider 140 is the location of a cell tower (i.e., the geographic coordinates of that cell tower), and the geographic coordinates received from mobile device 110 are in close physical proximity to the coordinates of the cell tower, then application server 120 computes a relatively high score at step 550 (which indicates a successful verification of the location of mobile device 110). However, if the coordinates received from network provider 140 and from mobile device 110 indicate that the cell tower and the mobile device are not in close physical proximity, this serves as an indication that the login request has been issued from an unauthorized mobile device. In this case, it is likely that the mobile device issuing the login request has falsified its network ID or device ID.

Having computed the verification score at step 550, device identification server 130 then encrypts that score using the session ID received at step 505. Then, at step 560, device identification server 130 transmits the encrypted score to application server 120. This enables application server 120 to make an assessment as to whether to allow or deny a login request from mobile device 110.

While the foregoing is directed to embodiments of the present invention, other and further embodiments of the invention may be devised without departing from the basic scope thereof, and the scope thereof is determined by the claims that follow.

What is claimed is:

1. A method of authenticating a user logging into a secure account using a mobile device, wherein the secure account is hosted on an application server that is communicating with the mobile device and a device identification server, said method comprising the steps of:

receiving, at the application server, from the mobile device a login request including login credentials of the user and a hardware identifier (ID) of the mobile device;

verifying, at the application server, the login credentials of the user and the hardware ID of the mobile device;

transmitting by the application server to the device identification server, a network identifier of the mobile device and a request for data indicating a proximity of a first geographical location to a second geographical location, wherein the first geographical location is a geographical location of the mobile device determined using a global positioning system (GPS) component installed in the mobile device, and the second geographical location is a geographical location of a base station with which the mobile device is currently communicating, and determined by the device identification server using the network identifier of the mobile device;

receiving, at the application server, the data indicating proximity of the first geographical location to the second geographical location, from the device identification server responsive to the request; and authorizing, at the application server, the user to log into the secure account upon determining that the data indicating proximity of the first geographical location to the second geographical location has a value that is within an acceptable range of values.

2. The method of claim 1, further comprising registering the login credentials of the user with the application server.

3. The method of claim 1, further comprising:

registering, by the application server, the hardware ID transmitted by the mobile device during registration to use the secure account, in a registry maintained by the application server; and responsive to the login request received from the mobile device, verifying, by the application server, that the hardware ID maintained in the registry matches the hardware ID associated with the login request.

4. The method of claim 3, wherein the application server verifies the hardware ID associated with the login request based on the network identifier associated with the mobile device.

5. The method of claim 3, further comprising:
determining, by the mobile device, one or more geographic coordinates corresponding to the geographical location of the mobile device;
transmitting, by the mobile device, the one or more geographic coordinates to the device identification server;
determining, by the device identification server, the geographical location corresponding to the base station with which the mobile device is currently communicating, the determining being based on the network identifier for the mobile device;
generating, by the device identification server, data indicating proximity of the geographic coordinates transmitted by the mobile device to the geographical location determined by the device identification server as the data indicating proximity of the first geographical location to the second geographical location; and
transmitting, by the device identification server, the data indicating the proximity of the first geographical location to the second geographical location to the application server.

6. The method of claim 1, further comprising:
generating at the application server, a session identifier, and transmitting the session identifier to the mobile device and the device identification server,
wherein the mobile device and the device identification server encrypt messages communicated to each other using the session identifier as an encryption key, and the device identification server encrypt the data indicating proximity of the first geographical location to the second geographical location using the session identifier as an encryption key.

7. A non-transitory computer-readable medium that stores instructions, where the instructions, when executed, cause an application server to perform steps of authenticating a user logging into a secure account using a mobile device, wherein the secure account is hosted on the application server and the application server is communicating with the mobile device and a device identification server, the steps comprising:
receiving, at the application server, from the mobile device a login request including login credentials of the user and a hardware identifier (ID) of the mobile device;
verifying, at the application server, the login credentials of the user and the hardware ID of the mobile device;
transmitting by the application server to the device identification server, a network identifier of the mobile device and a request for data indicating a proximity of a first geographical location to a second geographical location, wherein the first geographical location is a geographical location of the mobile device determined using a global positioning system (GPS) component installed in the mobile device, and the second geographical location is a geographical location of a base station with which the mobile device is currently communicating, and determined by the device identification server using the network identifier of the mobile device;
receiving, at the application server, the data indicating proximity of the first geographical location to the second geographical location, from the device identification server responsive to the request; and
authorizing, at the application server, the user to log into the secure account upon determining that the data indicating proximity of the first geographical location to the second geographical location has a value that is within an acceptable range of values.

8. The non-transitory computer-readable medium of claim 7, wherein the steps further comprises registering the login credentials of the user with the application server.

9. The non-transitory computer-readable medium of claim 7, wherein the steps further comprises:
registering, by the application server, the hardware ID transmitted by the mobile device during registration to use the secure account, in a registry maintained by the application server; and
responsive to the login request received from the mobile device, verifying, by the application server, that the hardware ID maintained in the registry matches the hardware ID associated with the login request.

10. The non-transitory computer-readable medium of claim 9, wherein the application server verifies the hardware ID associated with the login request based on the network identifier associated with the mobile device.

11. The non-transitory computer-readable medium of claim 9, wherein the steps further comprises:
determining, by the mobile device, one or more geographic coordinates corresponding to the geographical location of the mobile device;
transmitting, by the mobile device, the one or more geographic coordinates to the device identification server;
determining, by the device identification server, the geographical location corresponding to the base station with which the mobile device is currently communicating, the determining being based on the network identifier for the mobile device;
generating, by the device identification server, data indicating proximity of the geographic coordinates transmitted by the mobile device to the geographical location determined by the device identification server as the data indicating proximity of the first geographical location to the second geographical location; and
transmitting, by the device identification server, the data indicating the proximity of the first geographical location to the second geographical location to the application server.

12. The non-transitory computer-readable medium of claim 9, wherein the steps further comprises:
generating at the application server, a session identifier, and transmitting the session identifier to the mobile device and the device identification server,
wherein the mobile device and the device identification server encrypt messages communicated to each other using the session identifier as an encryption key, and the device identification server encrypt the data indicating proximity of the first geographical location to the second geographical location using the session identifier as an encryption key.

13. A system comprising:
a mobile device;

an application server;

a device identification server; and a network over which the mobile device, the application server, and the device identification server communicate;

the mobile device, application server, and device identification server configured to carry out authentication of a user logging into a secure account using the mobile device;

the application server is further configured to:

receive from the mobile device a login request including login credentials of the user and a hardware identifier (ID) of the mobile device;

verify the login credentials of the user and the hardware ID of the mobile device;

transmit to the device identification server, a network identifier of the mobile device and a request for data indicating a proximity of a first geographical location to a second geographical location, wherein the first geographical location is a geographical location of the mobile device determined using a global positioning system (GPS) component installed in the mobile device, and the second geographical location is a geographical location of a base station with which the mobile device is currently communicating, and determined by the device identification server using the network identifier of the mobile device;

receive the data indicating proximity of the first geographical location to the second geographical location, from the device identification server responsive to the request; and authorize the user to log into the secure account upon determining that the data indicating proximity of the first geographical location to the second geographical location has a value that is within an acceptable range of values.

14. The system of claim 13, wherein the system is further configured to register the login credentials of the user with the application server.

15. The system of claim 13, wherein the application server is further configured to:

register the hardware ID transmitted by the mobile device during registration to use the secure account, in a registry maintained by the application server; and verify that the hardware ID maintained in the registry matches the hardware ID associated with the login request in response to the login request received from the mobile device.

16. The system of claim 15, wherein the application server is further configured to:

verify the hardware ID associated with the login request based on the network identifier associated with the mobile device.

17. The system of claim 16, wherein the mobile device is further configured to:

determine one or more geographic coordinates corresponding to the geographical location of the mobile device; and transmit the one or more geographic coordinates to the device identification server; and wherein the device identification server is further configured to:

determine the geographical location corresponding to the base station with which the mobile device is currently communicating, the determining being based on the network identifier for the mobile device;

generate data indicating proximity of the geographic coordinates transmitted by the mobile device to the geographical location determined by the device identification server as the data indicating proximity of the first geographical location to the second geographical location; and transmit the data indicating the proximity of the first geographical location to the second geographical location to the application server.

18. The system of claim 13, wherein the application server is further configured to generate a session identifier, and transmitting the session identifier to the mobile device and the device identification server; and wherein the mobile device and the device identification server is further configured to encrypt messages communicated to each other using the session identifier as an encryption key, and the device identification server encrypt the data indicating proximity of the first geographical location to the second geographical location using the session identifier as an encryption key.

* * * * *